CHAIN STORE MAGNETIC MEMORY ARRAY

Filed June 23, 1964 Sheet 1 of 2

INVENTORS
HANS-OTTO G. LEILICH
WILLIAM H. RHODES, JR.
WILLIAM F. SHUTLER

BY David W. Koffsky
ATTORNEY

United States Patent Office 3,444,531

Patented May 13, 1969

3,444,531

CHAIN STORE MAGNETIC MEMORY ARRAY

Hans-Otto G. Leilich, William H. Rhodes, Jr., and William F. Shutler, Poughkeepsie, N.Y., assignors to International Business Machines Corporation, New York, N.Y., a corporation of New York Filed June 23, 1964, Ser. No. 377,309

Int. Cl. G11b 5/74, 5/64

U.S. Cl. 340—174 16 Claims

ABSTRACT OF THE DISCLOSURE

A memory employing magnetic chain storage elements in a plane and having magnetic units disposed on a conductor means characterized by a plurality of conductive return units comprised of conductive return planes coextending in opposed relationship to each other with each return unit coupled to a gating means. A drive means is connected to each storage element for influencing associated magnetic units to attain a predetermined state; and the conductor means is coupled at one end to an energization means and at the other end to a return unit whose planar elements sandwich the storage elements.

This invention relates to magnetic memories, and more particularly, to a magnetic memory circuit package.

Modern data processing systems are placing increasingly stringent speed requirements on their memory capabilities. These enhanced speeds must be met, but in such a manner as to produce a memory whose cost is competitive with its predecessors. To cope with these conflicting requirements, memory designers have invented numerous new memory configurations and devices. Among these have been the thin film magnetic memory, various ferrite arrays, miniaturized magnetic core configurations, and other batch-produced magnetic strip memory devices.

A magnetic strip memory device which has proven extremely useful in meeting increased memory requirements, is described in its various configurations in the following patent applications:

(a) Application of J. C. Sagnis, Jr., M. Teig and R. L. Ward, "Nondestructive Readout Magnetic Memory," Ser. No. 224,415, filed Sept. 18, 1962.

(b) Application of J. C. Sagnis, Jr. and P. E. Stuckert, "Magnetic Strip Memory," Ser. No. 255,479, filed Feb. 1, 1963.

(c) Application of J. L. Anderson, H. G. Leilich and D. H. Redfield, "Magnetic Memory," Ser. No. 332,746, filed Dec. 23, 1963, now Patent No. 3,371,327.

Copending patent applications (a) and (b) disclose a magnetic strip memory element in the form of a solid strip of conductive magnetic material of aperture configuration which is operable in the orthogonal mode. Because of the chain-like configuration of this type of memory device, it has come to be called "the chain store" and the magnetic strip to be called "the chain." Copending patent application (c) discloses a chain configuration wherein an apertured conductor is coated with a magnetic film to produce the chain storage element.

While the chain store is an inherently fast memory device, its speed advantages are lost if it is packaged in accordance with present magnetic memory techniques.

Accordingly, it is an object of this invention to provide an improved magnetic memory circuit package.

It is another object of this invention to provide an improved magnetic memory circuit package which allows the inherent merits of the memory elements to be achieved.

Still another object of this invention is to provide a magnetic memory package for the chain store.

And yet another object of this invention is to provide a chain store magnetic memory package wherein disturbing fields, return plane capacities, and induced noise due to gate and drive energizations are minimized.

In accordance with the above-stated objects, a magnetic memory package is provided wherein segmented, electrically isolated returns support the magnetic memory elements and provide circuit continuity for the memory element driving circuitry. The segmented returns reduce the current loop inductance, the capacity seen by the magnetic memory element energizing means and also, by their electrical isolation, aid in the logical memory element selection function.

Additional conductive returns are symmetrically disposed about the magnetic memory elements to confine the stray fields which result when they are energized. Further, an even number of magnetic memory elements are arranged between the conductive returns to enable a substantial portion of the noise induced by the memory circuitry into the sense circuitry to be eliminated by common mode rejection.

The foregoing and other objects, features and advantages of the invention will be apparent from the following more particular description of a preferred embodiment of the invention, as illustrated in the accompanying drawings.

Figure 1:
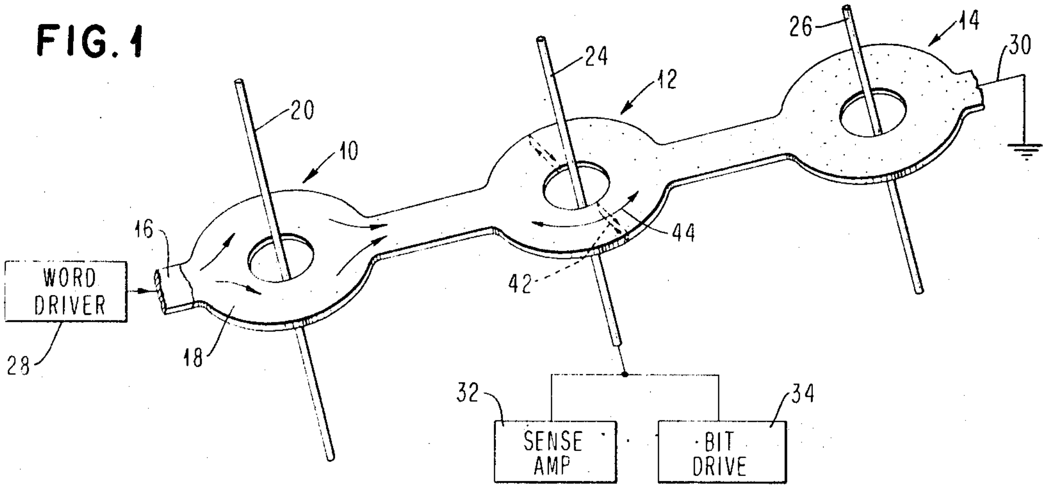
FIG. 1 is a schematic view of a single chain storage element and its associated circultry.

Referring now to FIG. 1, the operation of a chain storage element will be described in order to enable a better understanding of the invention. The chain storage element is composed of a number of bit storage devices 10, 12, and 14 arranged about the length of an apertured conductor 16. Bit storage devices 10, 12 and 14 are each formed by coating all surfaces of apertured conductor 16 with a relatively thin layer of magnetic material 18. The details of this structure are fully described in the aforementioned copending application (c). Bit-sense conductors 20, 24 and 26 pass respectively through the central apertures of each of bit storage devices 10, 12 and 14. At one end, conductor 16 is connected to word driver 28 while its other end is returned via conductor 30 to a source of reference potential. Each bit-sense line is connected to a sense amplifier, e.g., 32, and a bit driver, e.g., 34

The energization of word driver 28 causes a unidirectional word current pulse to be applied to conductor 16. This pulse divides in two legs of each bit storage device and recombines in the neck between adjacent bit storage devices before dividing for the next storage device. This current causes the magnetic vector of each bit storage device to assume a direction essentially at right angles to the direction of the chain element, such as shown by arrow 42. This magnetic orientation extends entirely around the legs of each bit structure.

A bit current applied to one of bit-sense lines 20, 24 or 26 produces a field which causes the magnetic orientation of film 18 to become circularly aligned aroound each chain device with a sense which is dependent upon the direction of current flow in the associated bit-sense conductor (as indicated by double-headed arrow 44). If word and bit currents are simultaneously applied, e.g., to conductor 16 and bit line 24, the combination of these two currents produces a resultant magnetic force which magnetically aligns material 18 generally in one or the other of the directions indicated by arrow 44 (depending upon the sense of the current in bit line 24). Once these currents are removed, the aforementioned orientation stably remains, thereby storing the desired information.

Figure 2:
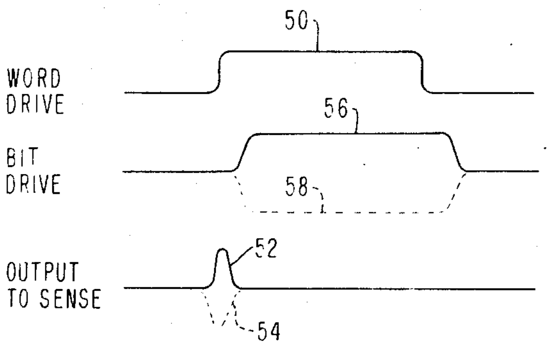
FIG. 2 is a waveform diagram helpful in understanding the operation of the chain storage element of FIG. 1.

One of a number of ways in which this memory can be operated is shown in FIG. 2. Word drive current 50 is first applied to conductor 16 and magnetically orients each bit storage device in the direction indicated by arrow 42. In the process of becoming so oriented, each bit storage device induces on its associated bit-sense line, a voltage whose polarity is dependent upon the sense of the previously stored bits. These signals (e.g., 52 or 54 in FIG. 2) are detected and amplified in the sense amplifiers (e.g., 32). To subsequently write new information into bit storage devices 10, 12 and 14, the associated bit drivers are energized in either a positive sense, e.g., waveform 56, or in a negative sense, e.g., wave form 58, while word driver 28 is still energized. The fields generated by these energizations combine to produce the aforedescribed resultant magnetic orientation in each storage device. Subsequently, the word and bit drive energizations are successively terminated to complete the storage of data. Bit drive waveform 56 is not terminated until after word drive energization 50 to assure that the magnetic orientation of each storage device reflects the correct information. This method of operation is fully described in copending application of Hans Otto Leilich, "Magnetic Memory Apparatus," Ser. No. 332,588, filed Dec. 23, 1963, now Patent No. 3,378,821.

Figure 3:
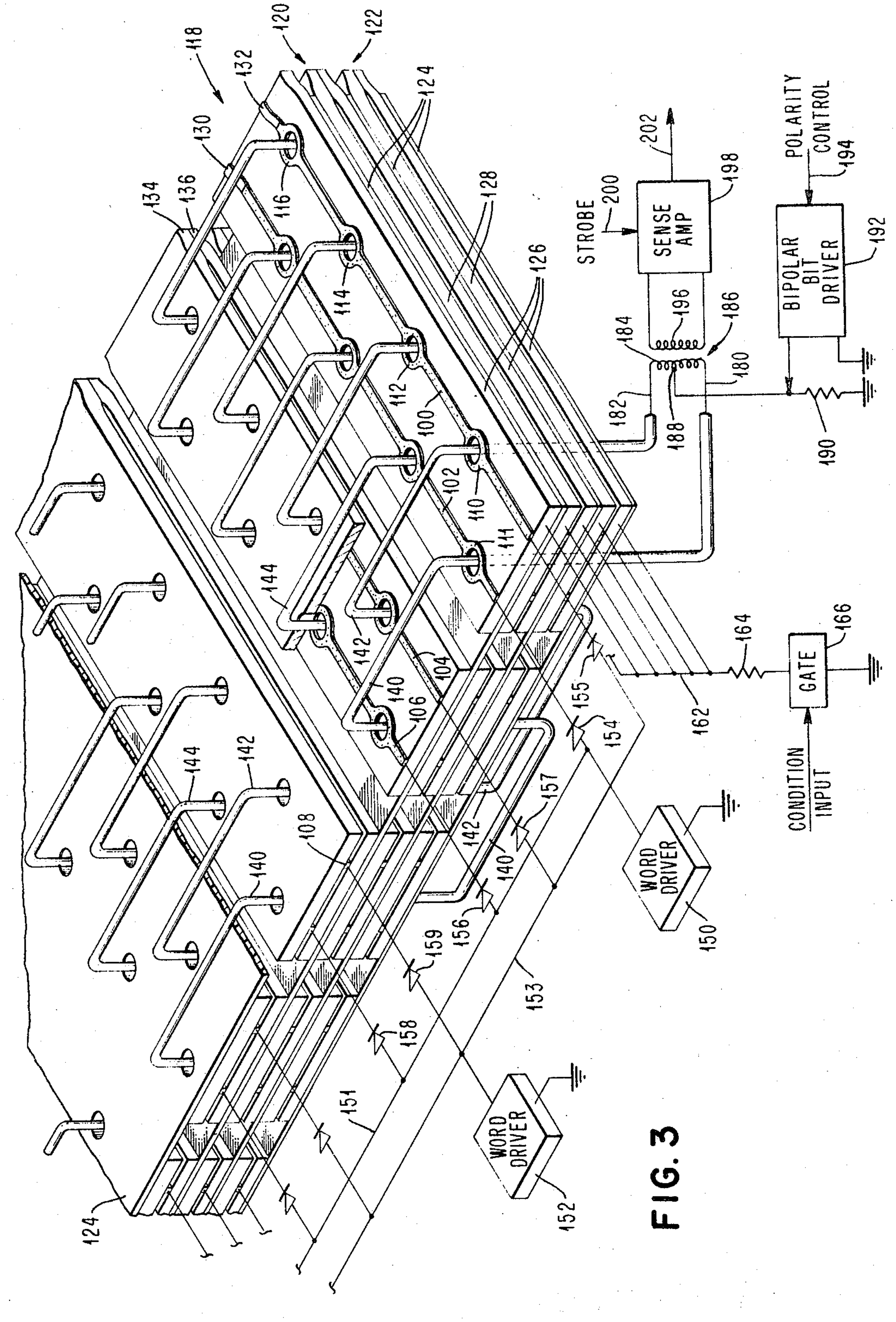
FIG. 3 is an isometric view of the chain store circuit package in accordance with the invention.

With the above-described operation of the chain store firmly in mind, reference is now made to FIG. 3 wherein a circuit package for such a store is shown. Certain portions of the chain store package of FIG. 3 have been broken away to better show its characteristic features. Chain storage elements 100, 102, 104, 106, 108, etc., are identical to that shown in FIG. 1. Each chain storage element is provided with a number of bit storage devices, for example, chain storage element 100 has four bit storage devices 110, 112, 114 and 116. A chain storage element is capable of storing a word of information. It must, of course, be realized that the length of each storage element is directly dependent upon the desired word length and that the showing of only four bit positions in FIG. 3 is for illustrative purposes only.

Figure 4:
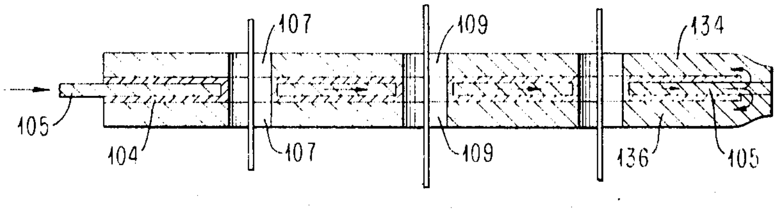
FIG. 4 is a longitudinal section of a chain storage element and its associated return planes.

The overall memory package is arranged in a plurality of planes 118, 120, 122, etc. Each plane is kept electrically independent of all planes (except for exterior connections to be hereinafter described) by interposed insulating sheets 124. Within each plane, all chain storage elements are sandwiched between pairs of parallel conductive return planes, e.g., 126 and 128. The upper return plane for chain storage elements 100 and 102 is not shown to enable the connection point between these chains and their respective return planes to be shown. The inner conductor of chain storage elements 100 and 102 is extended at points 130 and 132 to make connection with return plane 126. Then, when the upper return plane is placed over the chain storage elements, such as shown by return planes 134 and 136, a low resistance contact is made between both return planes and the inner conductor of the chain storage element. This is shown in greater detail in FIG. 4 where a longitudinal section of return planes 134 and 136 and chain storage 104 is illustrated. This configuration allows the current flowing in center conductor 105 to evenly divide between the return planes 134 and 135 with certain desirable effects which will be hereinafter detailed. To assure a low resistance connection, return planes 134 and 135 are slightly deformed at the point where the connection is made to inner conductor 105. Each return plane is provided with a plurality of apertures 107, 109, etc., which are aligned with the apertures in each bit storage device. By this mechanism, bit-sense lines 140, 142, 144, etc. (FIG. 3), can be threaded therethrough.

As stated in the introduction, it is equally important for this memory configuration to be cost competitive as well as fast. Accordingly, a diode-gate selection scheme is used to provide any access to any chain storage element. Other selection techniques, such as a discrete bit driver for each chain element, may be somewhat faster, but their speed advantages are outweighed by their higher costs.

To implement the diode selection scheme, each plane of memory package is divided into a number of rows, and corresponding vertically aligned rows are denoted as columns. In this case, a row comprises a single chain storage element and a column includes all vertically aligned return planes and their associated chain storage elements. Since all columns are identical, only the operation of the column containing return planes 126 and 128 and chain storage elements 100 and 102 will be hereinafter described.

To select one or the other of chain storage elements 100 or 102 so that information may be written therein or read therefrom, word drivers 150 and 152 are provided. Word driver 150 is connected via bus 151 to the anodes of selection diodes 154, 156, 158, etc., and word driver 152 is connected via bus 153 to the anodes of selection diodes 155, 157 and 159. The energization of word driver 150 conditions selection diodes 154, 156 and 158 for conduction while the energization of word driver 152 performs the same function with respect to selection diodes 155, 157 and 159. While the anodes of diodes 154–159 are connected to their respective word drivers, their cathodes are connected via the inner conductors of the chain storage elements to the return planes. For example, the cathode of diode 155 is connected via the inner conductor of chain storage element 100 at point 132 to return planes 126 and 128.

To complete the selection circuit, each return plane in a column is connected to a common conductor 162 and then through a resistor 164 to gate 166. When gate 166 is not conditioned, it applies a relatively high positive potential through resistor 164, conductor 162, return planes 126 and 128 to back bias the cathodes of the respectively connected selection diodes. This prevents these diodes from being conditioned for conduction by the application of an output from a word driver. Only when gate 166 is conditioned coincidentally with an output from a specific word driver will one of the selection diodes act to conduct current. Thus, in order to select chain storage element 100, gate 166 must first be conditioned to remove the high back bias from conductor 162. Then, when word driver 152 energizes bus 153 with a positive potential, current is made to flow through diode 155 into the inner conductor of chain storage element 100 through return planes 126 and 128, conductor 162, resistor 164 and gate 166 to ground.

The above-described application of drive currents to the inner conductor of a chain storage element causes fields to be generated both interior and exterior to the chain storage element which, if not contained, are detrimental to the operation of the memory as a whole. This is more clearly seen when it is realized that 144,000 bits of storage (using chain storage elements) can be packaged in 8.4 cubic inches. With this extremely tight packaging, and the resulting close proximity of chain storage elements, stray fields cannot be allowed to interfere with the operation of the system or else the resulting noise quickly renders the memory inoperable.

Figure 5:
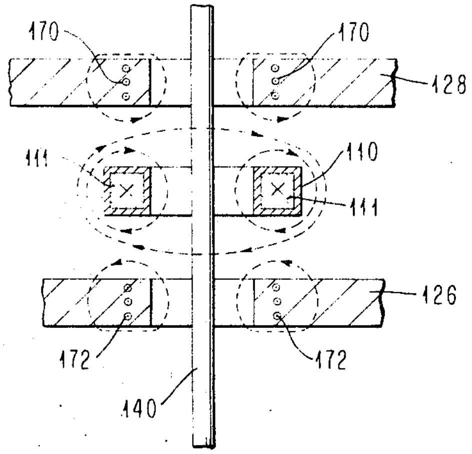
FIG. 5 is a lateral section of a bit storage device and its associated return planes.

Referring now to FIG. 5, a lateral cross section of bit storage device 110 is shown as it would be viewed from the cathode of diode 155. It is assumed that return plane 128 is in place. Return planes 126 and 128 have been removed somewhat from bit storage device 110 for the purpose of explaining the interaction of the fields created by the currents therein. Bit storage device 110 has an inner conductor 111 wherein the current flow is illustrated as being into the plane of the paper. The current in return planes 126 and 128 is schematically indicated at 170 and 172 as coming out of the plane of the paper. The schematic indication of currents 170 and 172 shown directly above and below bit storage element 110 are valid during the transient portions of the operation cycle when relatively high frequency currents are experienced and disturbing fields generated. During the steady state, these currents tend to evenly spread throughout the return planes. The current in inner conductor 111 creates a clockwise flux field around the legs of bit storage device 110. If this field is not confined, it seriously affects the operation of adjacent chain elements. Currents 170 and 172, on the other hand, create counterclockwise flux fields which are additive only within the enclosed area to the flux fields generated by the current in conductor 111. It can be seen that exterior to the area enclosed between return planes 126 and 128, the fields created by currents 170 and 172 subtract from the fields created by the current in conductor 111. Thus, interior to return planes 126 and 128, the fields surrounding bit storage element 110 are reinforced and assist in the operation of the storage element, whereas exterior to planes 126 and 128, any disturbing fields are cancelled. It is desirable that currents 170 and 172 be as nearly equal as possible so that the addition and subtraction of fluxes are symmetrical on both sides of bit storage element 110. This is assured by providing low resistance contacts (or equal impedance contacts) between the chain storage element inner conductors and the return planes. As aforestated, during the transient periods when the flux changes are most detrimental to memory operation, currents 170 and 172 are confined directly above and below bit storage element 110. This phenomenon further concentrates the flux fields and aids in the cancellation of undesired stray fields.

Returning now to FIG. 3, return planes 126, 128, 134, 136, etc., may be combined into a single plane for ease of fabrication. This configuration requires a rearrangement of the selection diodes since the logic performing function of the isolated planes is lost. One feasible organization is to connect the selection diodes to vertically aligned chain storage elements and a single gate to each plane. Using the single plane arrangement, the capacitance between the full plane surfaces as seen by the gate circuits is substantially increased and the time taken to charge or discharge this capacitance directly adds to the cycle time of the memory. For this reason, the return planes are preferably segmented so that the capacitance seen by each gate is as small as possible.

Bit-sense wires 140, 142, 144, etc, are threaded through the concentric apertures in the return planes and chain storage elements to provide both the writing and sensing function for the memory. Only bit-sense wires 140 and 142 will hereinafter be described, but it should be realized that additional pairs of bit-sense wires are arranged in an identical manner. At one extremity (not shown), bit-sense wires 140 and 142 are terminated and returned to ground. At the other extremity, bit-sense wires 140 and 142 are respectively connected via conductors 180 and 182 to either side of center tapped primary winding 184 of transformer 186. Center tap 188 is connected via resistor 190 to ground. Connected between center tap 188 and resistor 190 is the output of bipolar bit driver 192. The output of bit driver 192 is controlled by polarity control input 194. Secondary winding 196 of transformer 186 forms the input to sense amplifier 198. Strobe input 200 controls the operation of sense amplifier 198 in such a manner that an output is produced on conductor 202 only when strobe input 200 is energized.

In all known high speed memories, data signal outputs appear on the sense lines at extremely low levels. Noise, whether generated within or without the memory, is thus a major problem. The chain store is no exception. For instance, in the normal operation of the memory, gate 166 is conditioned to partially remove the back bias on selection diodes 154 and 155. The capacitance associated with return planes 126 and 128 causes the gate energization to induce a considerable amount of noise into the bit-sense lines. Next, depending upon which chain is to be selected, one of the word drivers is energized and forward biases diode 154 or 155. This results in a current flow through one of the chain storage elements which reads out the stored information on the associated bit-sense line. Unless the gate noise has been dissipated by this time, the data signals may very well be masked. Additionally, the energization of the word drive causes a sharp voltage drop in the gate (due to impedance in the gate) which induces an additional noise pulse coincident with the signal.

During the next portion of the cycle, bit current is applied to the bit-sense conductors from the bipolar bit drivers. The energization of a bit driver induces a large noise signal into the associated sense amplifier. When the bit driver is turned off, additional noise is induced into the sense amplifier. In practice, it has been found that gate noise and the energization of the bit drivers cause the most significant noise problems within the memory array. This is not only true with respect to the chain store but also with respect to many memory configurations.

It has been discovered that by arranging an even number of chain storage elements between any two return planes, that the noise resulting from both the bit drivers and gates can be simultaneously negated. This feature will become more apparent by referring to the arrangement of chain storage elements 100 and 102 as mounted between return planes 126 and 128. Bit-sense lines 140 and 142 thread corresponding bit storage devices, e.g., 110 and 111. The connection of bit-sense lines 140 and 142 via conductors 180 and 182 to center tapped primary 184, resistor 190 and ground performs the function of "common mode rejection" as it is known in the art. In other words, any common noise appearing on bit-sense lines 140 and 142 is identically translated via conductors 180 and 182 to primary winding 184. As is well known, the potential induced in secondary winding 196 from primary winding 184 is directionally proportional to the potential differences seen across conductors 180 and 182. If any noise appears in common on bit-sense lines 140 and 142, it is thus cancelled out in primary winding 184 and does not reach sense amplifier 198. Therefore, when gate 166 is conditioned, any resulting noise is induced equally into all bit-sense lines (e.g., 140 and 142) and is balanced out in primary winding 184. Likewise, any noise induced by the energization of bit driver 192 (or for that matter any other bit driver) is likewise induced equally into the bit-sense lines and cancelled.

It should be realized, that the above-mentioned noise cancellation arrangement, wherein both bit driver and gate noise are eliminated in a single means, is dependent only upon there being an even number of chain storage elements per return plane. Thus, if desired, return planes 126 and 128 could be merged with return planes 136 and 134, respectively, to form one continuous return plane. In this case, instead of two word drivers (150 and 152) four word drivers would be required to provide a selection function when gate 166 was conditioned. In all other respects the memory would remain the same and the noise cancellation scheme would be identical.

While the invention has been particularly shown and described with reference to a preferred embodiment thereof, it will be understood by those skilled in the art that the foregoing and other changes in form and details may be made therein without departing from the spirit and scope of the invention. For instance, instead of as shown, the connections to selection dioes 154–159 could be reversed and the column selection current could be made to flow from the column gates via the return planes, selection diodes to the energized word driver.

What is claimed is:

1. In a memory employing magnetic means for storage purposes, the combination comprising:
reference potential means;
conductive means for influencing said magnetic means to attain a predetermined magnetic state;
means for energizing said conductive means and connected at one end thereof;
a pair of planar conductive return means coextending in opposed relationship with each other with said magnetic means positioned therebetween;
means connecting the opposite end of said conductive means to adjacent first end portions of said conductive return means;
second conductive means for electrically connecting the opposite ends of said conductive return means to said reference potential means.

2. In a memory employing magnetic means for storage purposes, the combination comprising:
reference potential means;
conductive means for influencing said magnetic means to obtain a predetermined magnetic state;
means for energizing said conductive means and connected to one end thereof:
first and second planar conductive return means coextending in spaced relationship with each other and disposed, respectively, above and below said magnetic means and conductive means;
means connecting the opposite end of said conductive means to adjacent first end portions of said conductive return means; and
means for electrically connecting opposite end portions of said conductive return means to said reference potential.

3. In a memory employing a plurality of magnetic means for storage purposes, the combination comprising:
a source of reference potential;
gate means connected to said source;
first and second planar conductive return means coupled at adjacent first ends to said gate means, with said first and second planar conductive return means coextending in spaced relationship with each other;
energization means; and
conductive drive means associated with said plurality of magnetic means and coupled at one end to said energization means and at another end to the opposite adjacent ends of said first and second planar conductive return means, said conductive drive means and said plurality of magnetic means physically positioned between said first and second planar conductive return means.

4. In a memory employing a plurality of magnetic means for storage purposes, the combination comprising:
a reference potential source;
gating means connected to said reference potential source;
drive energization means;
first and second conductive return planes coupled at adjacent first ends to said gating means with said first and second conductive return planes coextending in spaced relationship with each other; and
conductive means for influencing said magnetic means to attain a predetermined magnetic state, said conductive means coupled at one end to said drive energization means and at another end in common to both said first and second conductive return planes at opposite ends thereof, said conductive means and said plurality of magnetic means physically positioned between said conductive return planes.

5. In a memory employing a plurality of magnetic chains for storage purposes, the combination comprising:
a reference potential;

column gating means connected to said reference potential;
word drive energization means;
first and second conductive return planes coupled at adjacent first ends to said gating means, with said first and second conductive return planes coextending in spaced relationship with each other; and
a word drive conductor interior to each said magnetic chain for influencing the associated magnetic chain to attain a predetermined magnetic state, said word drive conductor coupled at one end to a word drive energization means and at another end in common to both said first and second conductive return planes at opposite ends thereof, said word drive conductor and said associated magnetic chains physically sandwiched between said conductive planes.

6. In a memory employing a plurality of magnetic chains arranged in a matrix of columns and planes for storage purposes, the combination comprising:
a reference potential;
a column gate connected to said reference potential;
a plurality of plane word drivers;
first and second planar conductive returns for each said plane, with (a) both said conductive returns coupled at adjacent first ends to said column gate, and (b) with said conductive return planes coextending in opposed relation with each other; and
a word conductor interior to each said magnetic chain for influencing its associated chain to attain a predetermined magnetic state, said word conductor coupled at one end to one of said plane word drivers and at another end to both said first and second planar conductive returns at opposite ends thereof, said plurality of magnetic chains physically sandwiched between said conductive returns.

7. In a memory employing a plurality of magnetic means arranged in planes, the combination comprising:
a plurality of gating means associated with a plane;
energization means;
a plurality of pairs of return means in each plane, with each pair (a) coupled at adjacent first ends to a gating means, and (b) comprising a pair of planar conductor units coextending in spaced relationship with each other; and
conductive drive means associated with each magnetic means for influencing associated magnetic means to attain a predetermined magnetic state, said conductive means coupled at one end to said energization means and at another end to a pair of return means at opposite ends thereof, at least one said conductive drive means and said associated magnetic means physically sandwiched between each pair of planar conductor units.

8. In a memory employing a plurality of magnetic chains disposed in a matrix of columns and rows, the combination comprising:
reference potential means;
column gating means connected to said reference potential means;
row energization means;
a plurality of pairs of planar conductive returns in each row, all returns in a column coupled at adjacent first ends to a common column gating means, and with each pair of planar conductive returns coextending in spaced relationship with each other; and
a conductor interior to each said magnetic chain and adapted to influence its associated magnetic chain to attain a predetermined magnetic state, each said conductor coupled at one end to row energization means and at another end to a pair of conductive returns at opposite ends thereof, all said magnetic chains and associated conductor means in a row physically sandwiched between corresponding pairs of planar conductive returns.

9. In a memory employing a plurality of magnetic means arranged in planes, the combination comprising:
a plurality of gating means associated with a plane;
energization means;
a plurality of pairs of return means in each plane, each pair coupled at adjacent first ends to a gating means; and
conductive drive means associated with each magnetic means for influencing associated magnetic means to attain a predetermined magnetic state, said conductive means coupled at one end to said energization means and at another end to the opposite ends of said pair of return means, at least one said conductive drive means and said associated magnetic means physically sandwiched between each pair of return means, and wherein each pair of conductive returns sandwiches an even number of chains and associated conductors.

10. In a memory employing a plurality of magnetic means arranged in planes, the combination comprising:
a plurality of gating means associated with a plane;
energization means;
a plurality of pairs of conductive return means in each plane, each pair coupled at adjacent first ends to a gating means; and
conductive drive means associated with each magnetic means for influencing associated magnetic means to attain a predetermined magnetic state, said conductive means coupled at one end to said energization means and at another end to the opposite ends of said pair of return means, at least one of said conductive drive means and said associated magnetic means physically sandwiched between each associated pair of return means, and wherein each pair of conductive returns sandwiches a pair of magnetic chains.

11. In a memory employing magnetic means, the combination comprising:
gate means;
energization means;
conductive means for influencing said magnetic means to attain a predetermined magnetic state and connected at one end to said energization means;
first and second planar conductive return means connected at one pair of adjacent first extremities to said conductive means and at opposite extremities to said gate means, with (a) said first and second planar conductive return means coextending in spaced relationship with each other and (b) positioned to sandwich an even number of magnetic means therebetween;
bit drive means coupled to each magnetic means; and
common mode cancellation sense means coupled to said even number of magnetic means, the energization of said bit drive means and said gate means acting to induce noise signals on said sense means, said sense means acting to cancel said noise signals.

12. In a memory employing a plurality of magnetic chains, the combination comprising:
a reference potential;
column gating means connected to said reference potential;
word drive energization means;
first and second conductive return planes coupled to said gating means;
word drive means interior to each said magnetic chain for influencing the associated magnetic chain to attain a predetermined magnetic state, said word drive means coupled at one end to said word drive energization means and at another end to both said first and second conductive return planes, an even number of said word drive means and associated magnetic chains physically sandwiched between said conductive planes;
bit drive means coupled to each magnetic chain; and
common mode cancellation sense means coupled to said even number of magnetic chains for cancelling a substantial portion of all noise appearing in said return planes resulting from the energization of said bit drive means or column gate means.

13. In a memory employing a plurality of magnetic chains disposed in a matrix of columns and planes, the combination comprising:
reference potential means;
column gating means connected to said reference potential means;
word energization means;
a plurality of pairs of conductive returns in each plane, all returns in a column coupled to a common column gating means;
a conductor interior to each said magnetic chain and adapted to influence its associated magnetic chain to attain a predetermined magnetic state, each said conductor coupled at one end to word energization means and at another end to a pair of conductive returns, each pair of conductive returns sandwiching an even number of magnetic chains;
bit-sense conductors coupled to each magnetic chain; and
common mode cancellation sense means connected to a pair of bit-sense conductors which are coupled to corresponding bit positions in different ones of said even number of magnetic chains.

14. In a memory employing a plurality of magnetic chains arranged in a number of horizontal planes, each said chain including a central word conductor with a plurality of magnetically coated bit storage apertures, the combination comprising:
a plurality of pairs of electrically isolated apertured conductive return planes in each horizontal memory plane, each said pair sandwiching $n$ magnetic chains and electrically connected to the central word conductors for said $n$ chains, where $n$ is an even integer, the apertures in said conductive return planes aligned with the apertures in said magnetic chains;
$n$ word conductor drivers connected respectively via coupling diodes to the central word conductors for said $n$ magnetic chains;
a column gate connected to a plurality of correspondingly vertically positioned conductive return planes, the coincidental energization of said column gate and one of said word conductor drivers energizing the central word conductors for one of said $n$ magnetic chains;
a plurality of bit-sense conductors threaded through correspondingly vertically positioned bit storage apertures in said memory planes;
a bit driver connected to each bit-sense conductor; and
common mode rejection sense amplifiers, each sense amplifier coupled to first and second bit-sense conductors, said first and second bit-sense conductors threading corresponding bit storage apertures in a pair of said $n$ magnetic chains, said common mode rejection sense amplifier acting to cancel any noise coupled in common into said first and second bit-sense conductors.

15. In a memory employing a plurality of magnetic means arranged in planes, the combination comprising:
a plurality of gating means associated with a plane;
energization means;
a plurality of planar conductive return means in each plane, coextending in spaced relationship with each other, each return means coupled at one pair of adjacent first ends to a gating means; and
conductive drive means associated with each magnetic means for influencing associated magnetic means to attain a predetermined magnetic state, said conductive means coupled at one end to said energization means and at the other end to the opposite adjacent ends of a return means, at least one said magnetic means supported by and positioned between each said return means.

16. In a memory employing a plurality of magnetic chains disposed in a matrix of columns and rows, the combination comprising:

reference potential means;

column gating means connected to said reference potential means;

row energization means;

a plurality of planar conductive return means in each row, with (a) said planar conductive return means coextending in spaced relationship with each other and (b) all adjacent first ends of returns in a column coupled to a common column gating means; and a conductor interior to each said magnetic chain and adapted to influence its associated magnetic chain to attain a predetermined magnetic state, each said conductor coupled at one end to row energization means and at another end to the opposite adjacent ends of a conductive return means, all said magnetic chains and associated conductor means in a row physically supported by and positioned between said planar conductive return.

References Cited

UNITED STATES PATENTS

| | | | |
|---|---|---|---|
| 3,148,358 | 9/1964 | Snyder | 340—174 |
| 3,154,763 | 10/1964 | Bornhauser | 340—174 |
| 3,218,616 | 11/1965 | Huijer et al. | 340—174 |
| 3,229,263 | 1/1966 | Luebbe et al. | 340—174 |
| 3,302,190 | 1/1967 | Boylan et al. | 340—174 |
| 3,192,510 | 6/1965 | Flaherty | 340—166 X |
| 3,371,327 | 2/1968 | Anderson et al. | 340—174 |

OTHER REFERENCES

Anderson, J. L. et al.: "Cross Core Memory Construction," IBM TDB, vol. 5, No. 7, December 1962.

Taren, W. J.: "Balanced Magnetic Film Sensing," IBM TDB, vol. 5, No. 12, May 1963.

BERNARD KONICK, *Primary Examiner.*

JOSEPH F. BREIMAYER, *Assistant Examiner.*